United States Patent [19]

Mishina et al.

[11] Patent Number: 5,916,632

[45] Date of Patent: Jun. 29, 1999

[54] POLYIMIDE VARNISH

[75] Inventors: Makoto Mishina; Terumi Sato; Hiroyoshi Fukuro, all of Funabashi, Japan

[73] Assignee: Nissan Chemical Industries Ltd., Tokyo, Japan

[21] Appl. No.: 08/987,156

[22] Filed: Dec. 8, 1997

Related U.S. Application Data

[63] Continuation of application No. 08/288,726, Aug. 15, 1994, abandoned.

[30] Foreign Application Priority Data

Aug. 19, 1993 [JP] Japan ................................. 5-205165

[51] Int. Cl.$^6$ ........................................................ B05D 3/12
[52] U.S. Cl. ................ 427/240; 427/58; 427/64; 427/108; 427/387; 427/389.7; 427/407.2; 427/412.1
[58] Field of Search ................................ 427/240, 387, 427/389.7, 393.3, 407.2, 412.1, 108, 58, 64

[56] References Cited

U.S. PATENT DOCUMENTS

| | | | |
|---|---|---|---|
| 4,562,092 | 12/1985 | Wiech | 427/58 |
| 5,077,055 | 12/1991 | Schnur et al. | 427/58 |
| 5,137,751 | 8/1992 | Burgess et al. | 427/123 |
| 5,461,099 | 10/1995 | Ishikawa et al. | 524/317 |
| 5,520,952 | 5/1996 | Tanitso et al. | 427/58 |

*Primary Examiner*—Janyce Bell
*Attorney, Agent, or Firm*—Oblon, Spivak, McClelland, Maier & Neustadt, P.C.

[57] ABSTRACT

A polyimide varnish which is a solution having a polyimide and/or a polyimide precursor dissolved in an organic solvent and which is useful for forming a polyimide coating film on a substrate by coating the solution on the substrate followed by heat treatment, wherein from 5 wt % to 60 wt % of the organic solvent is a polypropylene glycol derivative of the formula (I):

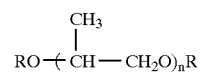

(I)

wherein n is 1 or 2, and R is hydrogen, a $C_{1-4}$ alkyl group, a $C_{1-4}$ alkenyl group or a $C_{1-4}$ alkanoyl group.

8 Claims, No Drawings

POLYIMIDE VARNISH

This application is a Continuation of application Ser. No. 08/288,726, filed on Aug. 15, 1994, now abandoned.

POLYIMIDE VARNISH

The present invention relates to a polyimide varnish. More particularly, it relates to a polyimide varnish which is a solution having a polyimide and/or a polyimide precursor dissolved in an organic solvent and which is useful for forming a smooth polyimide coating film on a substrate by coating the solution on the substrate followed by heat treatment.

By virtue of their characteristic high mechanical strength, heat resistance and solvent resistance, polyimides are widely used as protecting materials or insulating materials in the electric and electronic fields. Specifically, when they are used as insulating films for semiconductors, they are usually used to form polyimide coating films of from 1 μm to 10 μm on silicon substrates having wirings applied thereto. When they are used as liquid crystal alignment films, they are usually used to form thin polyimide coating films on various substrates, for example, to form polyimide coating films of from 0.05 μm to 0.2 μm on transparent substrates provided with transparent electrodes. To form such a polyimide coating film, it is common to coat on a substrate a polyimide varnish obtained by dissolving a polyimide or a polyimide precursor in a suitable organic solvent, by a method such as spin coating, offset printing or gravure printing, followed by heat treatment.

When a polyimide coating film is formed on a substrate, fluidity of the solution after coating is important to form a smooth film, since the irregularities on the coating film surface will be smoothed by the flow of the solution.

However, conventional solvents for polyimides usually have a high surface tension, whereby the fluidity is rather poor. Japanese Examined Patent Publication No. 81167/1992 proposes a method of incorporating butyl cellosolve to lower the surface tension of the solution. However, butyl cellosolve is not preferred from the practical viewpoint, since its toxicity is pointed out.

Under the circumstances, it is an object of the present invention to provide a polyimide varnish which is a solution of a polyimide and/or a polyimide precursor and which is useful for forming a polyimide coating film to be used, for example, as an insulating film or a protective film for an electrical or electronic device or as a liquid crystal orientation film, by coating the solution on a substrate, whereby a smooth polyimide coating film can be formed.

Thus, the present invention provides a polyimide varnish having a polyimide and/or a polyimide precursor dissolved in an organic solvent, wherein from 5 wt % to 60 wt % of the organic solvent is a propylene glycol derivative of the formula (I):

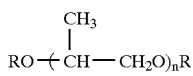

(I)

wherein n is 1 or 2, and R is hydrogen, a $C_{1-4}$ alkyl group, a $C_{1-4}$ alkenyl group or a $C_{1-4}$ alkanoyl group.

By the incorporation of the propylene glycol derivative of the formula (I) of the present invention, it is possible to uniformly and flatly coat the polyimide varnish on the substrate.

The polyimide and/or the polyimide precursor to be used for the polyimide varnish of the present invention is not particularly limited. Usually, it is common to react and polymerize a tetracarboxylic acid derivative with a primary diamine to obtain a polyimide precursor which is subjected to ring closure imide-conversion to obtain a polyimide.

Specific examples of the tetracarboxylic acid derivative to be used for obtaining the polyimide and/or the polyimide precursor of the present invention include aromatic tetracarboxylic acids such as pyromellitic acid, 2,3,6,7-naphthalene tetracarboxylic acid, 1,2,5,6-naphthalene tetracarboxylic acid, 1,4,5,8-naphthalene tetracarboxylic acid, 2,3,6,7-anthracene tetracarboxylic acid, 1,2,5,6-anthracene tetracarboxylic acid, 3,3',4,4'-biphenyl tetracarboxylic acid, 2,3,3',4'-biphenyl tetracarboxylic acid, bis(3,4-dicarboxyphenyl) ether, 3,3',4,4'-benzophenone tetracarboxylic acid, bis(3,4-dicarboxyphenyl)sulfone, bis(3,4-dicarboxyphenyl) methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl) diphenylsilane, 2,3,4,5-pyridine tetracarboxylic acid and 2,6-bis(3,4-dicarboxyphenyl)pyridine, and their dianhydrides as well as their dicarboxylic acid diacid halides; alicyclic tetracarboxylic acids such as 1,2,3,4-cyclobutane tetracarboxylic acid, 1,2,3,4-cyclopentane tetracarboxylic acid, 1,2,4,5-cyclohexane tetracarboxylic acid, 2,3,5-tricarboxycyclopentylacetic acid and 3,4-dicarboxy-1,2,3,4-tetrahydro-1-naphthalenesuccinic acid, and their dianhydrides as well as their dicarboxylic acid diacid halides; and aliphatic tetracarboxylic acids such as 1,2,3,4-butane tetracarboxylic acid, and their dianhydrides as well as their dicarboxylic acid diacid halides.

Specific examples of the diamine to be used for obtaining the polyimide and/or the polyimide precursor of the present invention include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy) diphenylsulfone, 2,2'-bis[4-(4-aminophenoxy)phenyl] propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane and bis(4-amino-3-methylcyclohexyl)methane; and aliphatic diamines such as hexamethylene diamine, as well as diaminosiloxanes of the formula (II):

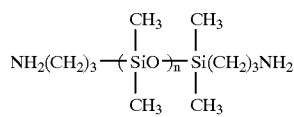

(II)

wherein n is an integer of from 1 to 10.

The tetracarboxylic acid derivative and the diamine are reacted and polymerized to obtain a polyimide precursor. As the tetracarboxylic acid derivative to be used here, it is common to employ a tetracarboxylic acid dianhydride. The molar ratio of the tetracarboxylic acid dianhydride to the diamine is preferably from 0.8 to 1.2. Like a usual polycondensation reaction, the polymerization degree of the resulting polymer increases as this molar ratio becomes close to 1.

If the polymerization degree is too low, the strength of the polyimide coating film tends to be inadequate. On the other hand, if the polymerization degree is too high, the operation efficiency for forming the polyimide coating film is likely to be poor.

Accordingly, the polymerization degree of the product in the present reaction is preferably at a level of from 0.05 dl/g to 5.0 dl/g (in N-methylpyrrolidone at a temperature of 30° C., concentration: 0.5 g/dl) as calculated as the reduced viscosity of the polyimide precursor solution.

The method for reacting and polymerizing the tetracarboxylic acid dianhydride with the diamine is not particularly limited. Usually, the diamine is dissolved in an organic polar solvent such as N-methylpyrrolidone, N,N-dimethylacetamide or N,N-dimethylformamide, and the tetracarboxylic acid dianhydride is added and reacted to the solution to obtain a polyimide precursor. As the temperature for the reaction, any optional temperature from −20° C. to 150° C., preferably from −5° C. to 100° C., may be selected.

Polyimides tend to be insoluble in organic solvents after the imide-conversion in many cases. Accordingly, it is usual to employ a method wherein the polyimide precursor is dissolved in an organic solvent to obtain a varnish, and this varnish is coated on a substrate and subjected to heat treatment on the substrate for imide-conversion to form a polyimide coating film on the substrate.

Here, the temperature for heating on the substrate for imide-conversion may be at an optional level of from 100° C. to 400° C. However, a temperature within a range of from 150° C. to 350° C. is particularly preferred.

On the other hand, when a polyimide is soluble in a solvent, it is possible to employ a method wherein a polyimide precursor is subjected to imide-conversion, and the obtained polyimide is dissolved in an organic solvent to obtain a varnish, which is then coated on a substrate, and then the substrate is subjected to heat treatment to evaporate the solvent to form a polyimide coating film on the substrate.

Here, as the method for imide-conversion of the polyimide precursor, a method for dehydration ring closure by heating in a solution, may be employed. The temperature for ring closure by dehydration under heating can be selected at an optional level within a range of from 100° C. to 350° C., preferably from 120° C. to 250° C.

As another method for converting the polyimide precursor to a polyimide, it is possible to carry out the ring closure chemically by means of a conventional catalyst for dehydration ring closure.

The polyimide varnish of the present invention is a varnish having the above polyimide and/or the polyimide precursor dissolved in an organic solvent, and from 5 wt % to 60 wt %, preferably from 10 wt % to 50 wt %, of the organic solvent constituting this varnish must be a propylene glycol derivative of the formula (I).

Specific examples of the propylene glycol derivative include 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-methoxypropoxy)propanol, 2-(2-ethoxypropoxy)propanol and 2-(2-butoxypropoxy)propanol. Particularly preferred is 1-butoxy-2-propanol or 2-(2-methoxypropoxy)propanol.

Such a propylene glycol derivative must be at least 5 wt % of the total amount of the solvent constituting the polyimide varnish of the present invention. Otherwise, the effect for smoothing the coating film tends to be inadequate. Such a propylene glycol derivative can not usually dissolve the polyimide and/or the polyimide precursor by itself. Therefore, if it exceeds 60 wt % of the total amount of the solvent, precipitation of the polymer tends to take place, whereby the stability of the varnish tends to be poor, such being undesirable.

Of the entire solvent constituting the polyimide varnish of the present invention, the solvent other than the above-described propylene glycol derivative is not particularly limited so long as it is capable of dissolving the polyimide and/or the polyimide precursor. For example, it may be 2-pyrrolidone, N-methylpyrrolidone, N,N-dimethylacetamide, N,N-dimethylformamide, dimethylsulfoxide, hexamethylphosphoramide or γ-butyrolactone.

In addition, even a solvent which is incapable of dissolving the polyimide and/or the polyimide precursor by itself, may be added to the above solvent within a range not to impair the solubility.

The method for dissolving the polyimide and/or the polyimide precursor in the above solvent to obtain a polyimide varnish, is not particularly limited.

For example, the reaction-polymerization solution of the above polyimide and/or the polyimide precursor may be used as it is. Otherwise, the resulting polyimide and/or the polyimide precursor is put into a large excess amount of water or a poor solvent such as methanol to recover it as a precipitate, which is again dissolved in the above solvent for use.

The amount of the resin content in the polyimide varnish varies depending upon the particular purpose of the varnish and is not particularly limited. However, it is usually from 2 wt % to 15 wt % in the case of a liquid crystal alignment film, and it is usually from 5 wt % to 30 wt % in the case of an insulating film.

Further, for the purpose of further improving the adhesion between the finally formed polyimide coating film and the substrate, an additive such as a coupling agent may also be incorporated as a component of the polyimide varnish of the present invention.

The polyimide varnish of the present invention is coated on a substrate and subjected to heat treatment to form a polyimide coating film having a uniform thickness on the substrate, which is then useful as an insulating film or a protective film of an electric or electronic device, or as an alignment film for a liquid display device.

Here, the coating method is not particularly limited. However, it is common to employ, for example, spin coating, roll coating, offset printing or gravure printing.

As the temperature for the heat treatment to form a polyimide coating film, a temperature for converting the polyimide precursor to the polyimide is necessary in a case where the polyimide varnish is a polyimide precursor solution. As such a temperature, an optional temperature within a range of from 100° C. to 350° C., preferably from 120° C. to 250° C., may be selected. In a case where the polyimide varnish is a polyimide solution, the temperature for heat treatment may be at such a level where the solvent evaporates, and it is usually from 80° C. to 150° C.

The substrate on which the polyimide coating film is to be formed, may suitably be selected depending upon the particular purpose of the polyimide coating film. For example, in the case of an insulating film or a protective film for semiconductor devices, it may be a silicon substrate having various wirings applied thereto. In the case of a liquid crystal orientation film, the substrate is a glass sheet or a plastic film provided with a transparent electrode.

Now, the present invention will be described in further detail with reference to Examples. However, the present invention is by no means restricted to such specific Examples.

EXAMPLE 1

41.0 g (0.1 mol) of 2,2-bis[4-(4-aminophenoxy)-phenyl] propane (hereinafter referred to as BAPP) and 19.2 g (0.098 mol) of 1,2,3,4-cyclobutanetetracarboxylic dianhydride were reacted in 340 g of N-methylpyrrolidone (hereinafter referred to as NMP) at room temperature for 10 hours to obtain a polyimide precursor solution. The reduced viscosity (ηsp/c) of the obtained polyimide precursor was 1.02 dl/g (0.5 wt % NMP solution, at 30° C.).

To 12 g of this solution, 12 g of NMP and 6 g of 1-butoxy-2-propanol were added to obtain a varnish having a total resin content of 6 wt %, which was spin-coated on a glass substrate provided with a transparent electrode, at a rotational speed of 2,000 rpm, followed by drying and curing to obtain a polyimide coating film having a thickness of about 3,000 Å. The obtained coating film was a smooth film without irregularities.

EXAMPLE 2

41.0 g (0.1 mol) of BAPP and 29.9 g (0.0995 mol) of 2,3-dicarboxy-1,2,3,4-tetrahydro-1-naphthalenesuccinic dianhydride were reacted in 400 g of NMP at room temperature for 10 hours to obtain a polyimide precursor solution. The reduced viscosity (ηsp/c) of the obtained polyimide precursor was 1.14 dl/g (0.5 wt % NMP solution, at 30° C.).

To 50 g of the obtained polyimide precursor solution, 10.8 g of acetic anhydride and 5.0 g of pyridine were added as a catalyst for imide-conversion, followed by a reaction at 50° C. for 3 hours to obtain a polyimide solution. This solution was put into 500 ml of methanol, and the resulting white precipitate was collected by filtration and dried to obtain a white polyimide powder. The reduced viscosity (ηsp/c) of the obtained polyimide was 1.04 dl/g (0.5 wt % NMP solution, at 30° C.).

6 g of this powder was dissolved in a mixed solvent comprising 74 g of γ-butyrolactone and 20 g of 2-(2-methoxypropoxy)propanol to obtain a varnish having a total resin content of 6 wt %, which was printed on a glass substrate provided with a transparent electrode, by flexo printing, followed by drying and curing to obtain a polyimide coating film having a thickness of about 1,000 Å. The obtained coating film was a smooth film without irregularities.

EXAMPLE 3

To 12 g of the polyimide precursor solution prepared in Example 1, 3 g of 1-butoxy-2-propanol was added to obtain a varnish having a total resin content of 12 wt %, which was spin-coated on a glass substrate provided with a transparent electrode, at a rotational speed of 2,000 rpm, followed by drying and curing to obtain a polyimide coating film having a thickness of about 3 μm. The obtained coating film was a smooth film without irregularities.

EXAMPLE 4

To 12 g of the polyimide precursor solution prepared in Example 1, 24 g of NMP and 9 g of 1-butoxy-2-propanol were added to obtain a varnish having a total resin content of 4 wt %, which was spin-coated on a glass substrate provided with a transparent electrode, at a rotational speed of 3,500 rpm, followed by drying and curing to obtain a polyimide coating film having a thickness of about 1,000 Å. The obtained coating film as a smooth film without irregularities.

COMPARATIVE EXAMPLE 1

To 12 g of the polyimide precursor solution prepared in Example 1, 18 g of NMP was added to obtain a varnish having a total resin content of 6 wt %, which was spin-coated on a glass substrate provided with a transparent electrode, at a rotational speed of 2,000 rpm, followed by drying and curing to obtain a polyimide coating film having a thickness of about 3,000 Å. The obtained coating film had fine irregularities and cissing observed on the surface, and it was impossible to obtain a smooth film.

COMPARATIVE EXAMPLE 2

To 12 g of the polyimide precursor solution prepared in Example 1, 3 g of NMP was added to obtain a varnish having a total resin content of 12 wt %, which was spin-coated on a glass substrate provided with a transparent electrode, at a rotational speed of 2,000 rpm, followed by drying and curing to obtain a polyimide coating film having a thickness of about 3 μm. The obtained coating film had fine irregularities observed on its surface, and it was impossible to obtain a smooth film.

COMPARATIVE EXAMPLE 3

To 12 g of the polyimide precursor solution prepared in Example 1, 33 g of NMP was incorporated to obtain a varnish having a total resin content of 4 wt %, which was spin-coated on a glass substrate provided with a transparent electrode, at a rotational speed of 3,500 rpm, followed by drying and curing to obtain a polyimide coating film having a thickness of about 1,000 Å. The obtained coating film had fine irregularities and cissing observed on its surface, and it was impossible to obtain a smooth film.

COMPARATIVE EXAMPLE 4

6 g of the polyimide powder obtained in Example 2 was dissolved in 94 g of γ-butyrolactone to obtain a varnish having a total resin content of 6 wt %, which was printed on a glass substrate provided with a transparent electrode, by flexo printing, followed by drying. The obtained coating film had fine irregularities observed on its surface, and it was impossible to obtain a smooth film.

The polyimide varnish of the present invention may be coated on various substrates and subjected to heat treatment to form polyimide coating films, which are useful as insulating films or protective films for electrical or electronic devices, or as liquid crystal orientation films. It is thereby possible to form smooth coating films without irregularities.

We claim:

1. A method of forming a polyimide coating film having a thickness of from 0.05 μm to 0.2 μm as a liquid crystal alignment film on a silicon substrate having wiring applied thereto or a transparent substrate of glass sheet or plastic film provided with a transparent electrode, which comprises coating a solution having a polyimide or polyimide precursor or both dissolved in an organic solvent on the substrate by spin coating or flexoprinting, followed by heat treatment, wherein from 5 wt. % to 60 wt. % of the organic solvent is a propylene glycol of the formula (I):

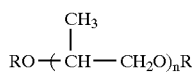
(I)

wherein n is 1 or 2, and R is independently hydrogen, $C_1$–$C_4$ alkyl, $C_1$–$C_4$ alkenyl, $C_1$–$C_4$ alkanoyl or phenyl.

2. The method of claim 1, wherein propylene glycol is selected from the group consisting of 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol, 1-monethyl ether-2-acetate, dipropylene glycol, 2-(2-methoxypropoxy) propanol, 2-(2-ethoxypropoxy)propanol and 2-2-butoxypropoxy)propanol.

3. The method of claim 2, wherein the propylene glycol is selected from the group consisting of 1-butoxy-2-propanol and 2-(2-methoxypropoxy)propanol.

4. The method of claim 1, wherein the solution having a polyimide or polyimide precursor or both is coated on the substrate by spin coating.

5. The method of claim 1, wherein the polyimide or polyimide precursor or both are coated on the substrate by flexoprinting.

6. The method of claim 5, wherein said heat treatment comprises heating said coated substrate to a temperature of from about 120° C. to 350° C.

7. The method of claim 1, wherein heat treatment comprises heating said coated substrate at a temperature of from 100° C. to 400° C.

8. The method of claim 1, wherein said propylene glycol is present in said organic solvent in an amount of from 10 to 50 wt. %.

* * * * *